United States Patent Office 3,234,134
Patented Feb. 8, 1966

1

3,234,134
TERPOLYMER OF AN α,β-UNSATURATED DICARBOXYLIC ACID ESTER, AN ALKYLENE ESTER AND A HYDROXYALKYL ACRYLATE, AND HYDROCARBON OIL COMPOSITIONS THEREWITH
Jack Rockett, Westfield, N.J., and Richard P. Crowley, Milton, Mass., assignors to Esso Research and Engineering Company, a corporation of Delaware
No Drawing. Filed Sept. 7, 1962, Ser. No. 222,223
8 Claims. (Cl. 252—56)

The present invention relates to oil soluble copolymer products in which one component of the copolymer comprises a hydroxyalkyl acrylate.

It has been well known for some time to use polymeric materials for imparting viscosity index improving and pour point depressing properties to lubricating oil compositions. In more recent work, it has been found desirable to modify such polymeric materials so that they will also function as sludge dispersants and detergent additives. The need for detergents and sludge dispersants in lubricating oils, particularly in oils employed as crankcase lubricants, has long been recognized. Heretofore, detergency and sludge dispersancy have been obtained in lubricating oil compositions by incorporating therein metal-containing additives, as for example alkaline earth metal organic sulfonates, metal alkyl phenates, metal alkyl phenol sulfides, and the like. Such additives have a disadvantage in high performance internal combustion engines, however, in that they promote the formation of ash residues in the combustion chamber. Such ash residues cause preignition, spark plug fouling, valve burning, and similar deleterious conditions. Accordingly, detergent and dispersant additives for crankcase lubricants that are either entirely ash-free or are at least relatively low in ash-forming tendencies are particularly desirable. Metal-free additives that have multifunctional characteristics, i.e., those that furnish viscosity index improving and pour point depressing properties in addition to detergency and sludge dispersancy, are particularly advantageous.

In accordance with the present invention, it has been found that lubricating-oil-soluble additives that have the multifunctional properties of viscosity index improvement, pour point depressancy, and sludge dispersancy can be prepared by copolymerizing hydrozyalkyl acrylates with other polymerizable esters. The hydroxyalkyl acrylates may be represented by the formula,

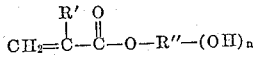

$$CH_2=C\overset{R'}{\underset{}{|}}-\overset{O}{\underset{}{\|}}-C-O-R''-(OH)_n$$

wherein R' is selected from the group consisting of hydrogen, methyl, and ethyl radicals, R'' is an alkylene hydrocarbon group of from 2 to 6 carbon atoms, and $n$ is an integer of from 1 to 5. Specific examples of such compounds include hydroxyamyl acrylate, hydroxyethyl ethacrylate, hydroxypropyl methacrylate, hydroxyethyl methacrylate, and 2,3-dihydroxypropyl methacrylate.

It is particularly preferred that the hydroxyalkyl acrylates be copolymerized with two types of esters, one being an ester of a $C_8$ to $C_{20}$ aliphatic alcohol and an alpha, beta-unsaturated dicarboxylic acid, and the other ester being an alkylene ester of a short chain aliphatic carboxylic acid. The preferred alpha, beta-unsaturated dicarboxylic acid is fumaric acid, although maleic acid or itaconic acid may be used. The alkylene esters include vinyl, isopropenyl, and allyl esters of short chain fatty acid such as acetic, proprionic and butyric acids, such as vinyl acetate, vinyl propionate, allyl acetate, isopropenyl acetate, and vinyl butyrate.

The broad and preferred ranges of molar proportions of the monomers employed in preparing the tripolymers of the invention are as follows:

| Component | Mole percent in terpolymer | |
|---|---|---|
| | Broad range | Preferred range |
| Hydroxyalkyl acrylate | 1–10 | 2–5 |
| Aliphatic ester of alpha, beta-unsaturated dicarboxylic acid | 15–50 | 20–30 |
| Alkylene ester of short chain fatty acid | 50–85 | 70–80 |

Specific examples of aliphatic alcohol esters of alpha, beta-unsaturated dicarboxylic acids that may be used in this invention include octyl itaconate, octadecyl maleate, lauryl fumarate, lauryl maleate, tallow maleates, oleyl fumarate, allyl fumarate, tallow fumarates, $C_8$ or $C_{13}$ oxo fumarate. Esters of glycol monoalkyl ethers and fumaric or maleic acids may also be used, as for example, cellosolve fumarate (glycol monoethyl ether fumarate).

By tallow fumarates or maleates is meant the esters of fumaric acid or maleic acid and the alcohols derived by hydrogenation of tallow. The latter are principally $C_{16}$ and $C_{18}$ alcohols, with minor amounts of $C_{12}$, $C_{14}$ and $C_{20}$ alcohols. The oxo alcohols are well known in the art and are prepared from olefins by reaction with carbon monoxide and hydrogen in the presence of a suitable catalyst such as one containing cobalt, e.g., a cobalt carbonyl. The reaction products are primarily aldehydes having one more carbon atom than the starting olefins. These aldehydes are then hydrogenated in a separate catalytic stage to convert them to the corresponding alcohols.

The tripolymers of the present invention may be prepared by any well-known polymerization process, including low temperature Friedel-Crafts polymerization, ionic polymerization processes, or radiation polymerization processes. Free radical catalysts, for example peroxide-type catalysts, are particularly useful. These include benzoyl peroxide, acetyl peroxide, urea peroxide, and tertiary butyl perbenzoate. A hydroperoxide or an azo catalyst such as alpha, alpha'-azo-bis-isobutyronitrile may be used. These catalysts may be employed in concentrations in the range of from about 0.01 to about 2 weight percent. The polymerization may be carried out in a suitable solvent in order to control reaction velocity and molecular weight. Oxygen may be excluded during the polymerization by the use of a blanket of an inert gas such as nitrogen or carbon dioxide. Solvents include benzene, heptane, mineral oil or other suitable organic solvent, and temperatures may range from about 165° to about 230° F. and reaction times may vary from about 3 to 7 hours. The final tripolymer may have a molecular weight in the range of from about 50,000 to about 600,000 or higher. The molecular weight can be determined by measuring the viscosity of solutions containing 5 milligrams of the copolymer per cc. in diisobutylene and applying the Staudinger equation. Molecular weights of from about 100,000 to about 500,000 are particularly preferred. Upon completion of the polymerization reaction the copolymer may be freed of solvent and employed as an additive for lubricating oils or for fuel oils. For convenience in blending at the termination of the polymerization, the polymer may be diluted with a light mineral oil and then stripped of solvent and unconverted monomers to give a concentrate of the polymer.

For use as lubricating oil additives for lowering pour point, improving viscosity index and increasing detergency, the tripolymers of the invention may be incorporated in lubricating oil compositions in concentration ranges of from about 0.1 to about 10 weight percent. The lubricating oils to which the additives of the invention may be added include not only mineral lubricating oils but various synthetic oils. The mineral lubricating oils may be of any preferred type, including those derived from the ordinary paraffinic, naphthenic, asphaltic, or mixed base mineral crude oils by suitable refining methods. Synthetic hydrocarbon lubricating oils may also be used. Non-hydrocarbon synthetic oils include dibasic acid esters such as di-2-ethylhexyl sebacate, carbonate esters, glycol esters such as $C_{13}$ oxo acid, diesters of tetraethylene glycol, and complex esters, as for example the complex ester formed by the reaction of 1 mole of sebacic acid with 2 moles of tetraethylene glycol and 2 moles of 2-ethylhexanoic acid.

The copolymers of the invention may also be employed in middle distillate fuels for inhibiting the formation of sludge and sediment in such fuels. When so employed they will be used in concentrations of from about 0.002 to about 2 weight percent. Preferred concentrations in such instances are from about 0.005 to about 0.1 weight percent. Petroleum distillate fuels boiling in the range from about 300° F. to about 900° F. are contemplated. Typical of such fuels are No. 1 and No. 2 fuel oils meeting ASTM Specification D-396-48T, diesel fuels qualifying as Grades 1D, 2D and 4D of ASTM Specification D-975-51T, and jet engine fuels such as those covered by U.S. Military Specification MIL-F-5624C.

In either the fuel or lubricant compositions, other conventional additives may also be present, including dyes, antioxidants, antiwear agents, rust inhibitors and other dispersants.

The copolymers of this invention may be employed either alone or in combination with other oil soluble additives in gasolines and jet fuels in amounts of from 0.001 to 1.0 wt. percent as anti-icing or detergent additives. In those gasolines having a tendency to stall when operating under humid and cool weather conditions, the addition of the oil soluble copolymer additives of this invention, possessing free hydroxy groups in the polymer chain, will serve to inhibit stalling by the unique combination of freezing point depressancy and carburetor detergency effects. For example, the tripolymer of a vinyl ester of a short chain fatty acid (e.g., vinyl acetate), an alkyl fumarate (e.g., lauryl fumarate), and an alkyl hydroxy acrylate (e.g., ethyl hydroxy methacrylate) can be employed in a leaded motor gasoline fuel having a 50% ASTM distillation point of less than 290° F. The terpolymer may be used for this function either alone or in combination with alcohols like isopropanol, glycols like hexylene glycol, aliphatic hydroxy amines like aminomethyl propanol, oil-soluble detergent type polymers, pyrrolidones like methyl pyrrolidone, and so forth, to enhance the anti-stalling characteristics of the fuel.

Additionally, the hydroxylalkyl acrylates and their copolymers as disclosed herein can be usefully employed in combination with phosphosulfurized hydrocarbons and/or neutralized phosphosulfurized hydrocarbons. An example of this type of material is the reaction product of from 5 to 25 wt. percent of a sulfide of phosphorus such as $P_2S_5$ with a low molecular weight (e.g., 300 to 20,000) $C_2$ to $C_6$ olefin polymer, such as a 1200 molecular weight polyisobutylene reacted with $P_2S_5$ from 2 to 10 hours at 150° to 240° F. The resulting acidic product can be optionally blown with steam from 1 to 6 hours at 200° to 220° F. to remove volatile by-product odor. To the extent that the acidic groups of the phosphosulfurized hydrocarbons can be made to react with the free hydroxy groups of the polymers of the examples, oil soluble, ashless, phosphosulfurized hydrocarbon derivatives having superior detergency characteristics will be formed. The phosphosulfurized hydrocarbons or their reaction products may also be treated with ethylene oxide of other alkylene oxides or with amides like urea or thiourea.

The following examples serve to illustrate the manner in which the present invention may be practiced and the advantages accruing from the use of the tripolymers of the invention.

*Example 1*

In a 2-liter reaction flask were placed 143.4 g. (0.234 mole) of di-tallow fumarate, 191.6 g. (0.564 mole) of di-isooctyl fumarate, and 162.5 g. of a mineral white oil identified as Bayol 85. It was heated in a nitrogen atmosphere until all of the solids were melted. A mixture of 192.2 g. (2.235 moles, of vinyl acetate, 14.5 g. (0.1113 mole) of hydroxyethyl methacrylate, and 2.2 cc. of tert-butyl perbenzoate was now added. Heating and stirring in a nitrogen atmosphere were continued until all of the fumarate ester had disappeared, as determined by polarographic analysis. The oil had thickened during this process and was finally diluted with a solvent neutral mineral oil (viscosity 150 SSU at 100° F.) to a concentration of 24.97%. Nitrogen purging caused all excess vinyl acetate to evaporate.

*Example 2*

In a 2-liter reaction flask were placed 143.4 g. of di-tallow maleate, 191.6 g. of di-isooctyl maleate, and 162.5 g. of Bayol 85. This mixture was heated and stirred in a nitrogen atmosphere. To it was now added a mixture of 192.2 g. of vinyl acetate, 14.5 g. of hydroxyethyl methacrylate, and 2.2 cc. of tert-butyl perbenzoate. The mixture was heated and stirred in a nitrogen atmosphere until the unpolymerized fumarate had virtually disappeared. The polymer-containing oil was diluted with solvent neutral mineral oil, and purged with nitrogen until free of excess vinyl acetate.

*Example 3*

In a 2-liter reaction flask were placed 128.7 g. (0.211 mole) of di-tallow fumarate, 206.3 g. of di-isooctyl fumarate (0.607 mole), and 219.0 g. of Bayol 85. The mixture was heated in a nitrogen atmosphere until melted, at which time 16.0 g. (0.1113 mole) of hydroxypropyl methacrylate, 196.8 g. (2.29 moles) of vinyl acetate, and 2.2 cc. of tertiary butyl perbenzoate were added. The mixture was heated and stirred until the fumarate ester had virtually disappeared. The resulting polymer solution was diluted with solvent neutral mineral oil, and purged with nitrogen to evaporate the excess vinyl acetate.

*Example 4*

In a 2 liter reaction flask were placed 71.7 g. (0.117 mole) of tallow fumarate, 15.1 g. (0.058 mole) of Cellosolve fumarate, 95.8 g. (0.282 mole) of isooctyl fumarate, and 71.1 g. of a white mineral oil. The mixture was heated to 93° C. in a nitrogen atmosphere. Now a mixture of 94.5 g. (1.097 moles) of vinyl acetate, 7.2 g. (0.553 mole) of hydroxyethylmethacrylate, and 1.2 cc. of tert. butyl perbenzoate was added. The mixture was heated and stirred for seven hours during which time white mineral oil was added frequently to keep the solution fluid. A total of 356.8 g. of oil was thus added. At the end of this time the unreacted fumarate had decreased to less than 2% of its original content. The solution was diluted with 250 g. of solvent neutral mineral oil, and purged with nitrogen until free of excess vinyl acetate.

*Example 5*

This example uses a fumarate made from Alfol 1216 in place of tallow fumarate. Alfol 1216 is a synthetic alcohol made by the Continental Oil Co. and consists of a mixture of normal alcohols from $C_{12}$ to $C_{16}$. In a 2 liter reaction flask were placed 132.5 g. (0.2778 mole) of Alfol 1216 fumarate, 35.0 g. (0.1029 mole) of iso-octyl fumarate, and 146.5 g. of a white mineral oil. After the mixture was heated to 80° C., 91.8 g. (1.066 moles) of vinyl acetate, 7.1 g. (0.0546 mole) of hydroxyethylmethacrylate, and 1.1 cc. of tert. butyl perbenzoate were added. The mixture was heated to 85–90° C. for four hours in a nitrogen atmosphere and then diluted with 250.0 g. of solvent neutral mineral oil.

*Example 6*

In this example, di-allyl maleate is included as an auxiliary monomer. Into a 2 liter reaction flask were placed 113.2 g. (0.185 mole) of tallow fumarate, 221.8 g. (0.652 mole) of isooctyl fumarate, 1.13 g. of di-allyl maleate, and 83.2 g. of a white mineral oil, and the mixture was heated to 80° C. Then 201.8 g. (2.344 moles) of vinyl acetate, 14.3 g. (0.110 mole) of hydroxyethylmethacrylate, and 2.2. cc. of tert. butyl perbenzoate were added. The reaction mixture was heated and stirred at 85–93° C. in a nitrogen atmosphere for 5½ hours, during which time the unreacted fumarate virtually disappeared. The polymer solution was diluted with 500 g. of solvent neutral mineral oil. (150 SSU viscosity at 100° F.)

*Example 7*

The concentrates of Examples 1 through 6 were each blended in a base oil and the viscosities and viscosity indexes of the base oil and of each of the blends were determined. The base oil consisted of about 60 weight percent of a solvent neutral mineral oil of 100 SSU viscosity at 100° F., about 35 weight percent of a solvent refined naphthenic mineral oil of 400 SSU viscosity at 100° F., and about 5 weight percent of commercial antiwear and detergent additive concentrates. The viscosity index improving properties of the additives are shown in Table I.

TABLE I

| Base oil plus additive concentrate as indicated | | Viscosity at 210° F. | Viscosity Index |
|---|---|---|---|
| Wt. percent of concentrate | Concentrate from example | | |
| 2.0 | 1 | 77.0 | 144.2 |
| 1.5 | 2 | 57.1 | 145.8 |
| 2.0 | 3 | 69.2 | 142.6 |
| 2.0 | 4 | 68.6 | 148.1 |
| 2.0 | 5 | 76.9 | 142.0 |
| 2.0 | 6 | 62.7 | 139.9 |
| Base oil alone | | 47.2 | 111.9 |

*Example 8*

The products of Examples 1, 3, 4 and 6 were employed separately as booster detergents in a low-temperature engine test in which conditions were intended to simulate stop-and-go driving. A six-cylinder Ford engine was used, charged with 4 quarts of the oil under test, and run for a total of 242 hours, under the conditions given in Table II, the cycles being repeated until the end of the test.

TABLE II.—LOW TEMPERATURE ENGINE TEST CONDITIONS

| | Cycle 1 | Cycle 2 | Cycle 3 |
|---|---|---|---|
| Cycle duration, hours | 1.5 | 2 | 2 |
| Engine r.p.m. | 500 | 2,000 | 2,000 |
| Air-fuel ratio | 11/1 | 13.5–14/1 | 13.5–14/1 |
| Brake horsepower load | 0 | 40 | 40 |
| Torque, pound feet | 0 | 105 | 105 |
| Oil sump temperature, °F | 180±5 | 180±5 | 215±5 |
| Jacket water out temp., °F | 190±5 | 160±5 | 180±5 |

At the end of the first 66 hours, and every 44 hours thereafter, the engine was inspected by removing the oil pan, the rocker arm cover, and the push rod chamber cover, and various parts including the oil screen, the oil pan, the crankshaft, the push rod chamber, the push rod chamber cover, the rocker arm cover, and the rocker arm assembly, were rated for sludge deposition, using a merit system in which 10 represents a clean part and zero a part covered with the maximum amount of sludge possible.

The test oil consisted of a solvent neutral mineral oil of 170 SSU viscosity at 100° F. containing 1.0 wt. percent of a zinc dialkyl dithiophosphate antiwear additive, 3.5 wt. percent of a commercial detergent inhibitor, and sufficient of the additive concentrate in each case to furnish 2 weight percent of actual copolymer. (Weight percentages are based on total composition.)

The detergent-inhibitor used in the test may be characterized as a colloidal complex o fphosphosulfurized hydrocarbons, barium alkyl phenate and barium carbonate in mineral oil, prepared by reacting a polyisobutylene of about 940 molecular weight with 15 weight percent $P_2S_5$, mixing the product with nonyl phenol and mineral oil and reacting the mixture with barium hydroxide and carbon dioxide at 250–300° F. for 6 to 10 hours to form a product having a representative weight percent composition as follows:

| | Percent |
|---|---|
| Phosphosulfurized polyisobutene | 27.0 |
| Alkyl phenol (248 average molecular weight) | 11.7 |
| Barium oxide | 10.6 |
| Carbon dioxide | 2.5 |
| Mineral oil | 48.2 |

The overall merit ratings obtained in the low temperature engine test are given in Table III. For comparison a prior art product was also tested consisting of a copolymer similar to those of the present invention but prepared from 49.3 mole percent of vinyl acetate, 31.4 mole percent of diisooctyl fumarate, 13.1 mole percent of di-tallow fumarate, and 6.2 mole percent of maleic anhydride. It will be seen from the data that the products of the present invention are superior to the prior art material.

TABLE III.—MERIT RATINGS

| Hours on test | 66 | 110 | 154 | 198 | 242 |
|---|---|---|---|---|---|
| Polymer in blend: | | | | | |
| Example 1 | 10.0 | 9.99 | 9.95 | 9.85 | 9.7 |
| Example 3 | 9.99 | | 9.85 | 9.82 | 9.2 |
| Example 4 | 9.96 | 9.97 | 9.96 | 9.7 | 9.6 |
| Example 6 | 9.98 | 9.96 | 9.88 | 9.85 | 9.7 |
| Prior art product | 9.96 | | 9.8 | 9.6 | 7.1 |

It is to be understood that the examples presented in the foregoing specification are merely illustrative of this invention and are not intended to limit it in any manner; nor is the invention to be limited by any theory regarding its operability. The scope of the invention is to be determined by the appended claims.

What is claimed is:

1. An improved oil-soluble polymeric additive for mineral oils comprising a polymerization product of an ester of an aliphatic alcohol and an alpha, beta-unsaturated dicarboxylic acid, an alkylene ester of a short chain fatty acid, and a hydroxyalkyl acrylate having the formula,

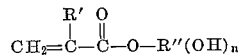

wherein R′ is selected from the group consisting of hydrogen, methyl, and ethyl radicals, R″ is an alkylene hydrocarbon group of from 2 to 6 carbon atoms, and $n$ is an integer of from 1 to 5.

2. Polymeric additive as defined by claim 1, wherein said hydroxyalkyl acrylate comprises hydroxyl methacrylate.

3. Polymeric additive as defined by claim 1, wherein said hydroxyalkyl comprises hydroxypropyl methacrylate.

4. Polymeric additive as defined by claim 1 wherein said polymerization product constitutes from 1 to 10 mole percent of said hydroxyalkyl acrylate, from 15 to 50 mole percent of said aliphatic ester of an unsaturated dicarboxylic acid, and from 50 to 85 mole percent of said alkylene ester of a short chain fatty acid.

5. Polymeric additive as defined by claim 1 wherein said alkylene ester of a fatty acid comprises vinyl acetate.

6. Polymeric additive as defined by claim 1 wherein said aliphatic ester of an unsaturated dicarboxylic acid comprises tallow alcohol fumarates.

7. Polymeric additive as defined by claim 1 wherein said aliphatic ester of an unsaturated dicarboxylic acid comprises a mixture of tallow fumarates and isooctyl fumarate.

8. An improved hydrocarbon oil composition comprising a major proportion of a hydrocarbon oil selected from the group consisting of hydrocarbon fuels and hydrocarbon lubricants and from about 0.002 to about 10 wt. percent of a copolymer as defined by claim 1.

References Cited by the Examiner
UNITED STATES PATENTS

| | | | |
|---|---|---|---|
| 2,611,763 | 9/1952 | Jones | 260–80.5 |
| 2,643,991 | 6/1953 | Towney | 260–80.5 |
| 2,892,792 | 6/1959 | Stewart et al. | 252–56 |
| 3,001,942 | 9/1961 | Mulvany et al. | 252–56 |

JOSEPH L. SCHOFER, *Primary Examiner.*

D. E. WYMAN, *Examiner.*